Jan. 7, 1958 — C. E. TACK — 2,819,062
AXLE ASSEMBLY
Filed Oct. 21, 1953

INVENTOR.
Carl E. Tack

United States Patent Office 2,819,062
Patented Jan. 7, 1958

2,819,062
AXLE ASSEMBLY

Carl E. Tack, Chicago, Ill., assignor to American Steel Foundries, Chicago, Ill., a corporation of New Jersey Application October 21, 1953, Serial No. 387,347

4 Claims. (Cl. 267—8)

The invention relates to a novel axle assembly of the trailing wheel type.

The invention comprehends an improved axle assembly of the type disclosed in Patent No. 2,455,787, issued December 7, 1948, to Frank F. Linn, and in Patent No. 2,668,051, issued February 2, 1954, to Albert F. Seelig, Jr. More particularly the invention involves the incorporation of a torque distributing and shock absorber means in the axle assembly whereby the axle affords improved riding qualities to the supported vehicle.

It is a principal object of the invention to provide a novel axle assembly of the type described with a floating brake flange and torque link whereby braking torque is distributed directly to the vehicle body instead of causing unwanted oscillations in the supported vehicle and to incorporate with said link an hydraulic shock absorber to cushion the distribution of braking torque forces to the vehicle body and to snub other axle movements.

It is a specific object of the invention to provide a shock absorber of the bleeding fluid type to accomplish the cushioning action heretofore described.

Figure 1:
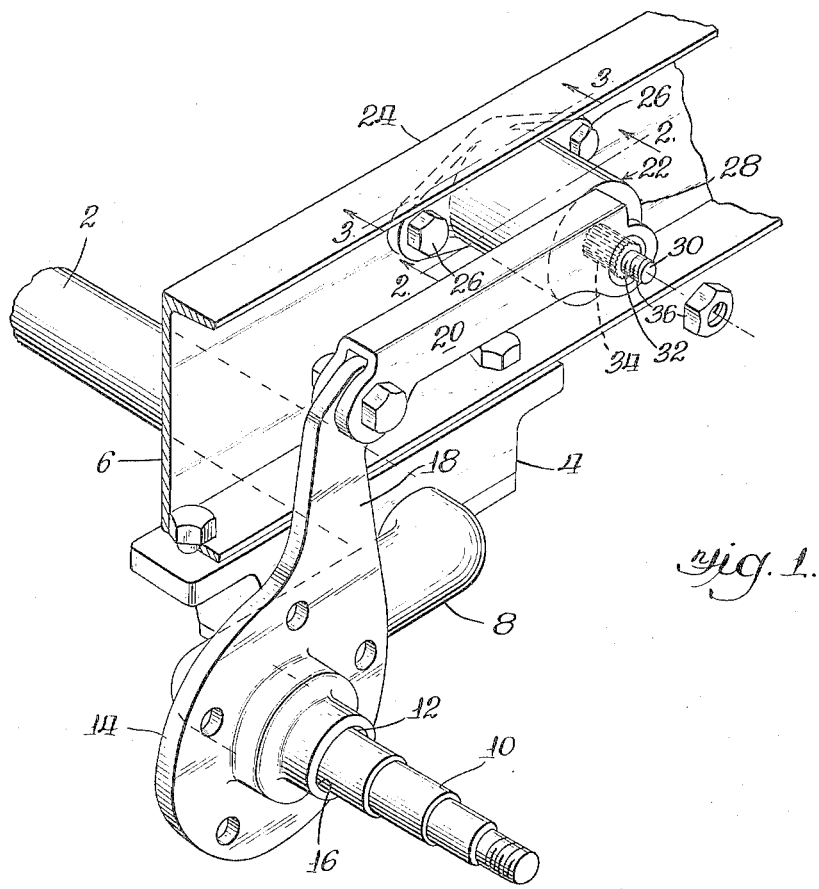
Figures 2, 3:
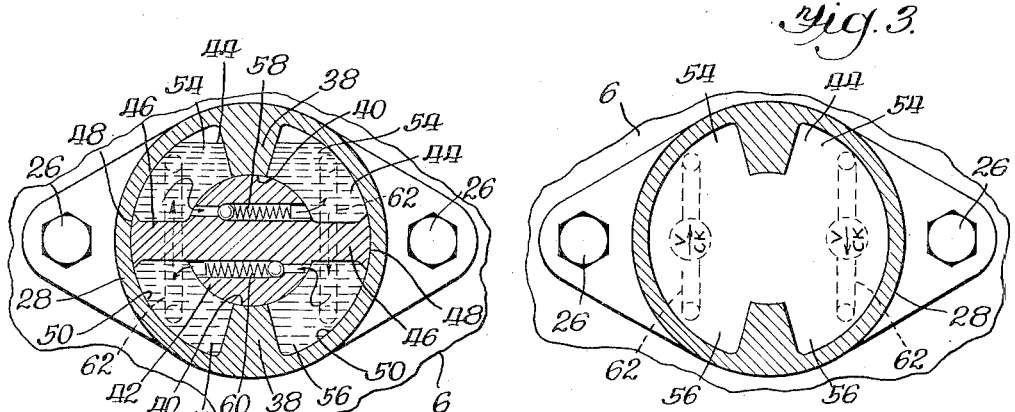

These and other objects of the invention will become apparent in the course of the following description and from an examination of the concerned drawings, wherein:

Figure 1 is a fragmentary perspective view illustrating the general arrangement of the axle assembly, Figure 2 is a sectional view taken through the shock absorber approximately along line 2—2 of Figure 1, and Figure 3 is a fragmentary view taken approximately along line 3—3 of Figure 1 with the internal actuated member of the shock absorber removed.

It will be noted that the figures illustrate only one end of the novel axle assembly, it being understood that the structure shown is duplicated in the other side of the assembly.

Describing the invention in detail and referring to the above mentioned patents, it will be seen that the trailing type axle assembly employs a main shaft 2 journaled for rotation in a bearing bracket 4, said bearing bracket being secured to the underside of a supported vehicle herein fragmentarily illustrated at 6. Immediately outboardly of the bracket 4 a crank 8 is provided on the main shaft 2, said crank extending transversely and preferably perpendicular to the axis of the main shaft 2. On the end of the crank 8 remote from the main shaft 2 an outwardly extending spindle 10 is provided, said spindle offering journal mounting for a conventional wheel (not shown) which in turn offers the support for the related vehicle. Although not shown in the instant drawings, it will be understood from reference to the mentioned patents that spring means, preferably a coiled spring, is disposed to surround the main shaft 2 and have its opposite ends fixed to the bracket 4 and to the shaft 2 whereby rotation of the spindle 10 about the axis of the main shaft 2 is resiliently resisted thus offering flexible support for the associated vehicle.

Adjacent the inboard end of the spindle 10 a shouldered bearing surface 12 is provided. A brake flange or stator 14 having a centrally disposed hole 16 is sleeved for rotational movement on the bearing surface 12 of the spindle 10. A brake mechanism to decelerate the related vehicle such as any conventional brake shoe (not shown), is attached to the brake stator 14 to operatively engage a braking surface such as a drum (not shown) carried by the associated wheel (not shown).

An upwardly extending arm 18 is formed integrally with the brake stator 14, said arm being pivotally connected to one end of a torque link 20. A shock absorber device 22 is rigidly mounted on the vehicle body in any convenient location such as on the channel which forms the lower supporting member for the vehicle 6. The shock absorber 22 is preferably bolted to the channel as at 26, said shock absorber consisting of a generally cylindrical housing 28 having extending from the outboard end thereof a shaft 30, said shaft having a fixed connection to the free end of the torque link 20 as at 32. The fixed connection between the shaft 30 and the link 20 is provided by means of a male spline 34 being received within a complementally formed female spline in an appropriate aperture on the end of the torque link. It should be noted, however, that any convenient means may be utilized to provide a nonrotatable connection between the shaft 30 and the torque link 20. A thread and nut assembly 36 is provided to fixedly maintain the link and shaft in assembled relation.

Referring now to Figure 2, which illustrates the internal construction of the shock absorber, it will be seen that the cylindrical housing 28 is provided with internally directed bosses 38, 38, said bosses being provided with cylindrical surfaces 40, 40 at the internal ends thereof which cooperate with a cylindrical actuating member 42 to divide said cylinder 28 into two chambers 44, 44. The actuating member 42 is additionally provided with oppositely directed wings 46, 46, said wings having arcuate surfaces 48, 48 at the outboard ends thereof which complementally engage the internal arcuate surfaces 50, 50, of the chambers 44, 44. The actuating member 42 is rigidly attached to the shaft 30 and is mounted in the cylinder 28 for rotational movement therein. An extremely close fit is provided at 40, 40 between the actuating member 42 and the cylinder lugs 38, 38 and at the surfaces 48, 48 between the wings 46, 46 and the arcuate surfaces 50, 50 of the chambers 44, 44, said fits being of such a nature as to provide a hydraulically sealed sliding fit at said surfaces. The wings 46, 46 of the actuating member 42 divide the chambers 44, 44 into two sections, that is, upper sections 54, 54 and lower sections 56, 56. A spring loaded one-way ball check valve 58 is provided in the actuating member 42 to interconnect the upper chambers 54, 54, said valve 58 accommodating flow of hydraulic fluid from the left-hand chamber 54 to the right-hand chamber 54 and preventing a return flow of said fluid. Additionally, the actuating member 42 is provided with another one-way spring loaded ball check valve 60 which interconnects the lower sections 56, 56, said lower ball check valve 60 accommodating flow of hydraulic fluid from the right-hand chamber 56 to the left-hand chamber 66 and preventing a return flow of said fluid. As indicated in the drawings, the chambers 44, 44 in the operating device are filled to capacity with any suitable hydraulic fluid such as oil.

Referring now to Figures 2 and 3, it will be seen that return lines and check valves 62, 62 are provided in chambers 44, 44, each of said lines interconnecting the upper section 54 and lower section 56 of each chamber 44. As illustrated more clearly in the fragmentary drawing Figure 3 the left-hand line 62 and incorporated valve accommodates flow of fluid upwardly from the lower chamber 56 to upper section 54 of the left-hand chamber 44 while preventing a return flow in said line. The right-hand line 62 accommodates a flow of fluid downwardly in the right-hand chamber 44 from the upper section 54 to the lower section 56 while preventing a return flow of fluid.

In operation of the novel structure, the stator 14 is rotatable on the spindle 10, hence will not transmit braking torque to the axle assembly. The torque link 20 is operative to limit rotation of the stator 14 during brake application and transmits the torque directly to the associated vehicle via its connection to the shaft 30 which is rigidly connected to the vehicle body. Additionally, any arcuate movement of the spindle 10 about the main shaft 2 causes a corresponding arcuate movement of the torque link 20 which is connected to the spindle carried brake stator 14. Arcuate movement of the torque link 20 causes rotation of the shaft 30 which in turn rotates the connected actuating member 42 internally of the shock absorber 22. Upon clockwise rotation of the actuating member 42 the pressure on the trapped hydraulic fluid in the left upper section 54 is increased causing the upper check valve 58 to displace and bleed the hydraulic fluid to the right-hand upper section 54 of the opposite chamber. The same arcuate motion of the actuating member 42 causes a bleeding of the hydraulic fluid trapped in the lower right-hand section 56 to the lower left-hand section 56 via the check valve 60. This bleeding action of the hydraulic fluid is operative to resist the rotation of the torque link 20 and the operatively connected spindle 10 and to absorb and cushion any unwanted oscillation in both the link 20 and the spindle 10. Upon counterclockwise movement of the actuating member 42, the valves 58 and 60 are closed and prevent a return of the hydraulic fluid therethrough. However, the lines 62, 62 interconnecting the upper and lower sections of each chamber 44, accommodate a return of fluid between the upper and lower sections of each chamber.

I claim:

1. In an axle assembly of the trailing wheel type a vehicle body, a bearing bracket provided on the vehicle body, a shaft journaled in said bearing bracket, a crank connected to the shaft outboardly of the bracket, a spindle connected to the crank in spaced relationship to the shaft, a brake flange journaled on the spindle, a link disposed above and substantially parallel to said crank and having one of its ends pivotally connected to said flange above said spindle, a double acting hydraulic shock absorbing device connected to the vehicle body, a shaft projecting from one end of said device, and a nonrotatable connection between said shaft and the other end of said link, said flange, link and shock absorbing device coacting to distribute braking torque forces to said body to resist relative movement of the body and spindle toward each other, said crank and link having effectively unlimited range of movement, said link being disposed normally at a relatively flat obtuse angle to a plane through the spindle and the pivotal connection between the flange and the link.

2. In an axle assembly of the trailing wheel type a vehicle body, a bearing bracket provided on the vehicle body, a shaft journaled in said bearing bracket, a crank connected to the shaft outboardly of the bracket, a spindle connected to the crank in spaced relationship to the shaft, a brake flange journaled on the spindle, a link disposed above and substantially parallel to said crank and having one of its ends pivotally connected to said flange above said spindle, a double acting hydraulic shock absorbing device connected to the vehicle body, a shaft projecting from one end of said device, and a nonrotatable connection between said shaft and the other end of said link, said flange, link and shock absorbing device coacting to distribute braking torque forces to said body to resist relative movement of the body and spindle toward each other, said crank and link having effectively unlimited range of movement, said link being disposed normally at a relatively flat obtuse angle to a plane through the spindle and the pivotal connection between the flange and the link, said shock absorbing device comprising a hollow cylinder, an actuating member rotatable in said cylinder, lugs abutting the actuating member and dividing said cylinder into chambers, wings formed on the actuating member abutting said cylinder and dividing said chambers into sections, valve means in the actuating member interconnecting the chambers, and other valve means interconnecting the sections of each chamber.

3. An axle assembly according to claim 2, in which said valve means in the actuating member accommodate flow between said chambers in opposite directions, and the other valve means interconnecting the sections accommodate flow between the sections in opposite directions.

4. In an axle assembly of the trailing wheel type, a vehicle body, a bearing bracket secured to the vehicle body, a shaft journaled in said bearing bracket, a crank connected to the shaft outboardly of the bracket, a spindle connected to the crank in spaced relationship to the shaft, a brake flange journaled on the spindle, a link disposed above and substantially parallel to said crank and having one of its ends pivotally connected to said flange above said spindle, a double acting hydraulic shock absorbing device connected to the vehicle body, a shaft projecting from one end of said device, and a nonrotatable connection between said shaft and the other end of said link, said flange, link and shock absorbing device coacting to distribute braking torque forces to said body to resist relative movement of the body and spindle toward each other, said link being disposed normally at a relatively flat obtuse angle to a plane through the spindle and the pivotal connection between the flange and the link, said crank and link having effectively unlimited range of movement, said hydraulic device comprising a plurality of fluid filled chambers, a retaining actuating member disposed within said chambers and dividing the latter into sections, valve means accommodating the flow of fluid between said chambers during certain movements of said actuating member, and other valve means accommodating the flow of fluid between said sections during other movements of said actuating member.

References Cited in the file of this patent

UNITED STATES PATENTS

| | | |
|---|---|---|
| 1,982,853 | Brainard | Dec. 4, 1934 |
| 1,991,911 | Riley | Feb. 19, 1935 |
| 2,043,489 | Peo | Jan. 3, 1936 |
| 2,136,586 | Dubonnet | Nov. 15, 1938 |
| 2,142,872 | Haushalter | Jan. 3, 1939 |
| 2,383,101 | Woolson et al. | Aug. 21, 1945 |
| 2,542,261 | Probst | Feb. 20, 1951 |
| 2,668,051 | Seelig | Feb. 2, 1954 |